United States Patent
Smith et al.

(10) Patent No.: US 10,843,613 B2
(45) Date of Patent: Nov. 24, 2020

(54) AMENITIES PANEL FOR PASSENGER SEAT FOR HOLDING PASSENGER BELONGINGS AND DEVICES

(71) Applicant: Safran Seats USA LLC, Gainesville, TX (US)

(72) Inventors: Josh T. Smith, Sanger, TX (US); Christopher D. Stewart, Saint Jo, TX (US); Jason K. Smith, Denton, TX (US); Kevin Waters, Denton, TX (US); Nahum Madrid, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/336,190

(22) PCT Filed: Jul. 28, 2017

(86) PCT No.: PCT/US2017/044309
§ 371 (c)(1),
(2) Date: Mar. 25, 2019

(87) PCT Pub. No.: WO2018/057117
PCT Pub. Date: Mar. 29, 2018

(65) Prior Publication Data
US 2019/0283644 A1    Sep. 19, 2019

Related U.S. Application Data

(60) Provisional application No. 62/399,898, filed on Sep. 26, 2016, provisional application No. 62/478,969, filed on Mar. 30, 2017.

(51) Int. Cl.
*B60N 3/00* (2006.01)
*B64D 11/00* (2006.01)
(Continued)

(52) U.S. Cl.
CPC ............. *B60N 3/004* (2013.01); *B60N 3/102* (2013.01); *B60R 1/00* (2013.01); *B60R 7/005* (2013.01);
(Continued)

(58) Field of Classification Search
CPC ........ B60N 3/004; B60N 3/102; B60N 2/242; B60R 1/00; B60R 7/005; B60R 11/02;
(Continued)

(56) References Cited

U.S. PATENT DOCUMENTS 10,538,333 B1 *  1/2020  Pinger ................ B64D 11/0642
10,696,410 B2 *  6/2020  Wilcynski .......... B64D 11/0642
(Continued)

FOREIGN PATENT DOCUMENTS

| CN | 101115656 | 1/2008 |
| EP | 2569187 | 3/2013 |

(Continued)

OTHER PUBLICATIONS

International Patent Application No. PCT/US2017/044309, International Search Report and Written Opinion, dated Oct. 18, 2017.

*Primary Examiner* — Mark R Wendell
(74) *Attorney, Agent, or Firm* — Kilpatrick Townsend & Stockton LLP

(57) ABSTRACT

An amenities panel for a passenger seat includes a body and at least one convenience feature. The body includes an aft-facing side and is configured to connect to a backrest of the passenger seat. The amenities panel is configured to be positioned between a forward-facing side of the backrest and a stowed tray table.

17 Claims, 8 Drawing Sheets

(51) Int. Cl.
*B64D 11/06* (2006.01)
*B60N 3/10* (2006.01)
*B60R 1/00* (2006.01)
*B60R 7/00* (2006.01)
*B60R 11/02* (2006.01)
*B61D 33/00* (2006.01)
*B63B 29/04* (2006.01)
*B60N 2/24* (2006.01)
*B60R 11/00* (2006.01)

(52) U.S. Cl.
CPC .......... *B60R 11/02* (2013.01); *B60R 11/0235* (2013.01); *B61D 33/0007* (2013.01); *B63B 29/04* (2013.01); *B64D 11/00151* (2014.12); *B64D 11/00152* (2014.12); *B64D 11/0624* (2014.12); *B64D 11/0636* (2014.12); *B64D 11/0638* (2014.12); *B60N 2/242* (2013.01); *B60R 2011/0015* (2013.01); *B63B 2029/043* (2013.01)

(58) Field of Classification Search
CPC ........ B60R 11/0235; B60R 2011/0015; B64D 11/00151; B64D 11/0624; B64D 11/0638; B64D 11/00152; B64D 11/0636

USPC ........................................................ 297/163
See application file for complete search history.

(56) References Cited

U.S. PATENT DOCUMENTS

| | | | |
|---|---|---|---|
| 2010/0155536 | A1 | 6/2010 | Asami et al. |
| 2012/0139303 | A1 | 6/2012 | Westerink et al. |
| 2014/0311388 | A1 | 10/2014 | Korpi |
| 2015/0108798 | A1 | 4/2015 | Boyer |
| 2016/0249073 | A1 | 8/2016 | Margis et al. |
| 2019/0344896 | A1* | 11/2019 | Wilcynski .............. B64D 11/00 |

FOREIGN PATENT DOCUMENTS

| | | |
|---|---|---|
| FR | 2989651 | 10/2013 |
| GB | 2321757 | 8/1998 |
| WO | 2015157309 | 10/2015 |
| WO | 2016140631 | 9/2016 |
| WO | 1997026811 | 7/2017 |

* cited by examiner

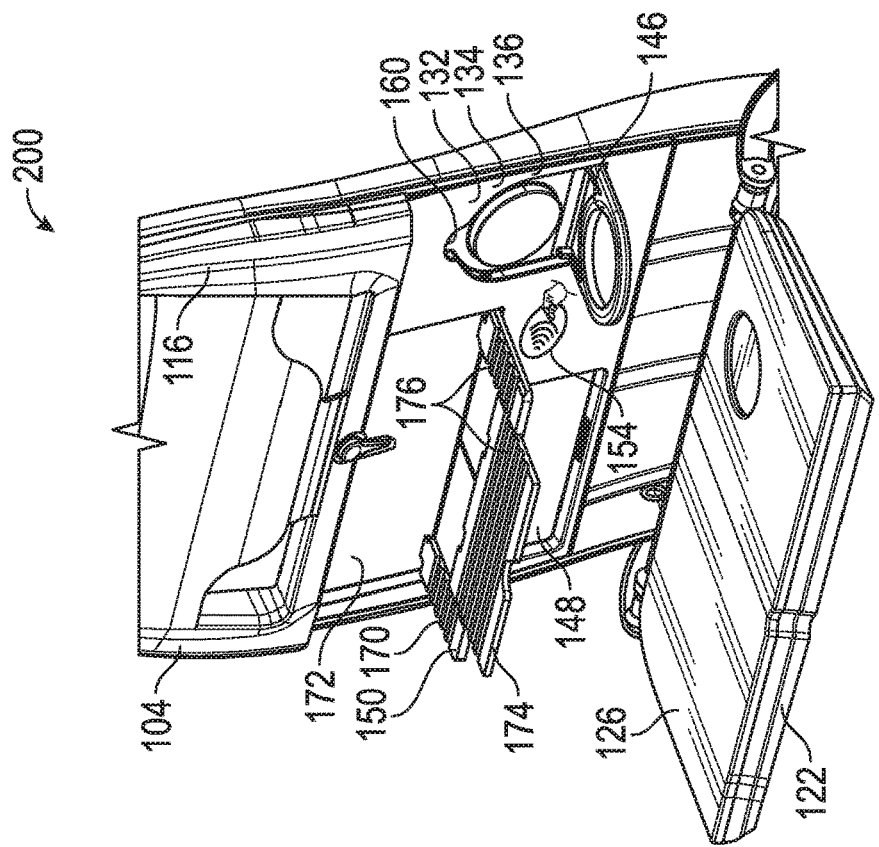
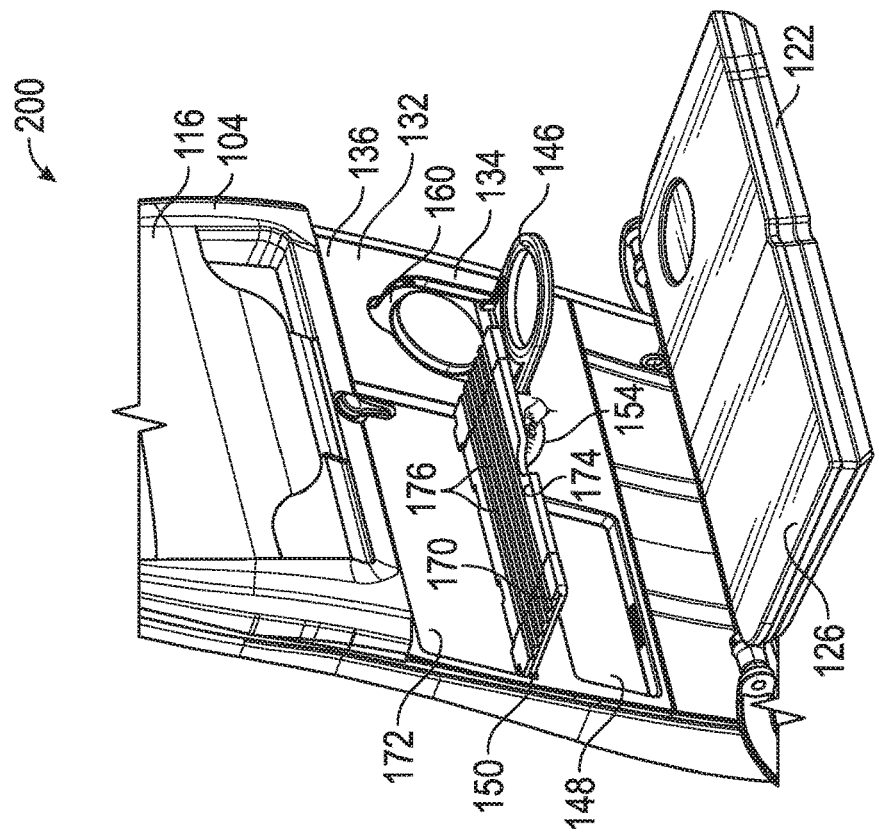

AMENITIES PANEL FOR PASSENGER SEAT FOR HOLDING PASSENGER BELONGINGS AND DEVICES

REFERENCE TO RELATED APPLICATIONS

This application claims the benefit of U.S. Provisional Application No. 62/399,898, filed Sep. 26, 2016 and entitled AMENITIES POCKET FOR PASSENGER BELONGINGS AND DEVICES, and the benefit of U.S. Provisional Application No. 62/478,969, filed on Mar. 30, 2017 and entitled NEW GENERATION OF ECONOMY CLASS OFFERING ENHANCED PASSENGER EXPERIENCE, which are both incorporated in their entireties by this reference.

FIELD OF THE INVENTION

This application relates to passenger seats, and more particularly to an amenities panel for a passenger seat.

BACKGROUND

Passenger vehicles, such as aircraft, buses, trains, ships, and automobiles, include passenger seats for passengers. It is common for a passenger to carry a number of personal belongings that he or she may wish to access and/or use during travel, such as a passport, computer, glasses, wallet, tablet, phone, book or other literature, drink container, etc. However, storage of such personal belongings is generally limited to the passenger's bag or a literature pocket on the passenger seat, such as a passenger aircraft seat.

While the passenger's bag may provide sufficient storage space, the bag typically must be stowed during travel and is not easily accessible. Alternatively, the literature pocket provides only a limited space for small items, and thus provides insufficient storage options to the passenger. Moreover, because the literature pocket is typically covered (e.g., by a tray table when deployed) and at a lower location on the back of the seat, passengers fear that they will forget items placed in the literature pocket.

As a result, there is still a need for a passenger seat that accommodates the passenger's belongings during travel.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a passenger seat includes a backrest, a tray table, and an amenities panel. The backrest includes a forward-facing side and an aft-facing side. The tray table includes an upper surface and a lower surface. The tray table is pivotally connected to the backrest and movable between a stowed position and a deployed position. The amenities panel is connected to the backrest and positioned between the forward-facing side of the backrest and the upper surface of the tray table when the tray table is in the stowed position. The amenities panel includes at least one convenience feature.

In some examples, the amenities panel includes an aft-facing side, and the aft-facing side of the amenities panel faces the upper surface of the tray table when the tray table is in the stowed position. In various cases, the at least one convenience feature includes a shelf having a body defining a support surface, and the shelf is pivotable relative to the aft-facing side of the amenities panel between a stowed position and a deployed position when the tray table is in the deployed position. In certain cases, the support surface includes support grooves extending across a width of the shelf. In various examples, the shelf further includes a shelf extension. A width of the shelf extension is less than a width of the body of the shelf. In various examples, the shelf extension is slidable relative to the body of the shelf between a deployed position and a stowed position when the tray table is in the deployed position. In certain examples, wherein the aft-facing side of the amenities panel defines a shelf-receiving cavity, wherein the shelf is positionable within the shelf-receiving cavity when the shelf is in the stowed position, and wherein a lower surface of the shelf is substantially flush with the aft-facing side of the amenities panel when the shelf is in the stowed position.

In various examples, the at least one convenience feature includes a cup holder. The cup holder is pivotally connected to the amenities panel and movable between a stowed position and a deployed position. In some examples, the amenities panel further defines a cup holder cavity configured to receive the cup holder when the cup holder is in the deployed position.

In various aspects, the at least one convenience feature includes an electronics connector, and the amenities panel further includes an electronics connector cover configured to selectively cover the electronics connector when not in use. In certain aspects, the passenger seat further includes an In-Flight Entertainment (IFE) monitor connected to the electronics connector.

In some examples, the at least one convenience feature includes at least one of a bungee pocket, a literature pocket, a bungee band, a mirror, a wireless payment system, cable storage, or a wireless charging system. In various cases, the amenities panel includes a plurality of convenience features.

According to certain aspects, an amenities panel for a passenger seat includes a body including an aft-facing side. The body is configured to connect to a backrest of the passenger seat and be positioned between a forward-facing side of the backrest and a stowed tray table. The amenities panel also includes at least one convenience feature on the aft-facing side.

In some cases, the at least one convenience feature includes a shelf including a body defining a support surface. The shelf is pivotable relative to the aft-facing side of the amenities panel between a stowed position and a deployed position. In various examples, the shelf further includes a shelf extension, and a width of the shelf extension is less than a width of the body of the shelf. In some aspects, the shelf extension is slidable relative to the body of the shelf between a deployed position and a stowed position. In various aspects, the aft-facing side defines a shelf-receiving cavity, and the shelf is positionable within the shelf-receiving cavity when the shelf is in the stowed position. In some cases, a lower surface of the shelf is substantially flush with the aft-facing side of the amenities panel when the shelf is in the stowed position.

According to various examples, a passenger seat includes a backrest, a tray table connected to the backrest and movable between a stowed position and a deployed position, and an amenities panel including at least one convenience feature. The amenities panel is connected to the backrest and positioned between the backrest and the tray table when the tray table is in the stowed position.

In some examples, the tray table substantially covers the amenities panel when the tray table is in the stowed position. In various examples, the at least one convenience feature includes at least one of a shelf, a cup holder, an electronics connector, a bungee pocket, a literature pocket, a bungee band, a mirror, a wireless payment system, cable storage, or a wireless charging system. In certain examples, the amenities panel includes a plurality of convenience features.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 6A is a rear view of a passenger seat assembly with an amenities panel and a tray table in a stowed position according to aspects of the present disclosure.

FIG. 6B is another rear view of the passenger seat of FIG. 6A with the tray table in a deployed position.

DETAILED DESCRIPTION

Figure 1:
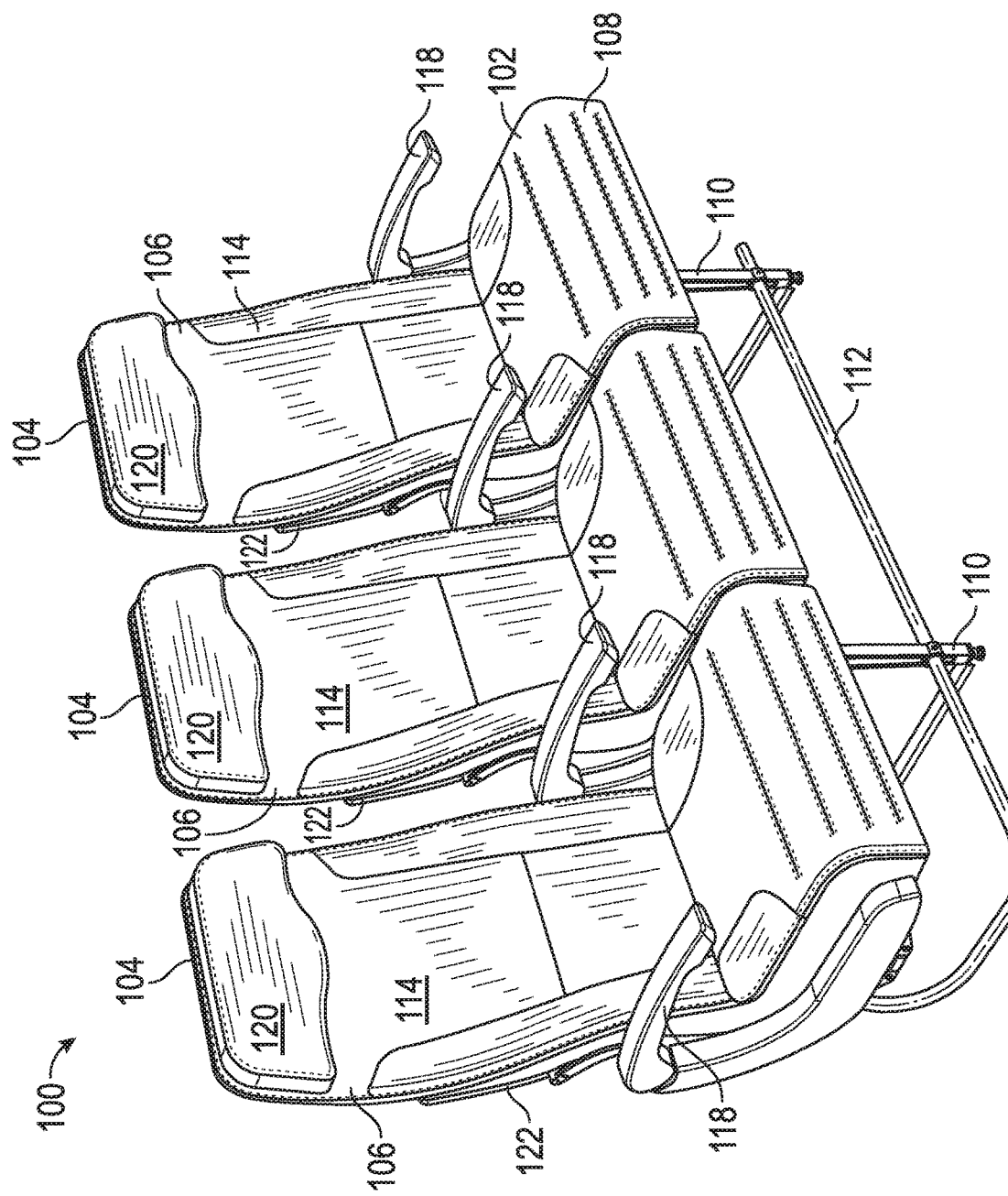
FIG. 1 is a front perspective view of a passenger seat assembly according to aspects of the current disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "forward," "aft," "up," "down," "top," "left," "right," "front," "back," and "corners," among others are intended to refer to the orientation as illustrated and described in the figure (or figures) to which the components and directions are referencing.

In one aspect, disclosed is an amenities panel for a passenger seat, such as an aircraft passenger seat, and associated methods, systems, devices, and various apparatus. The amenities panel includes a body and at least one convenience feature. It would be understood by one of skill in the art that the disclosed amenities panel is described in but a few exemplary aspects among many.

The amenities panel is configured to connect to a backrest of a passenger seat. In some examples, the passenger seat includes a tray table, and the amenities panel is configured to be positioned between the tray table and the backrest when the tray table is stowed. Typically, the area behind the tray table (when stowed) is an empty and unused area with dress cover fabric of the passenger seat. By providing the amenities panel in this area behind the tray table when the tray table is stowed, the amenities panel can support a number of functions without sacrificing any of the limited personal living space of the passenger. In addition, this location of the amenities panel allows a passenger's items to be more accessible and placed in usable places.

In some examples, the amenities panel may be constructed from various plastics, aluminum, stainless steel, aramid fibers, polycarbonate, polypropylene, other metallic materials, composite materials, or other similar materials. Depending on the needs of the end user, the amenities panel is customizable such that a number of convenience features may be included with the amenities panel, including, but not limited to, a shelf, a cup holder, phone/passport storage, electronic payment systems, wireless charging systems, literature pockets, USB ports or other electronic connectors, headset cable storage, a mirror, a bungee surface, a bungee pocket, and various other convenience features.

FIGS. 1-5 illustrate an example of a passenger seat assembly 100. The passenger seat assembly 100 includes a base 102 and a backrest 104. In the present example, the passenger seat assembly 100 is capable of carrying a quantity of three passengers, and accordingly has three backrests 104. It will be appreciated that in various other examples, the passenger seat assembly 100 can be capable of carrying any desired number of passengers, such as one passenger, two passengers, three passengers, four passengers, or any other desired number of passengers. In these examples, the passenger seat assembly 100 can likewise have any desired number of corresponding backrests 104. Each backrest 104 has a forward-facing side 114 and an aft-facing side 116 (see FIG. 2). When used by the passenger, the forward-facing side 114 is a side against which a passenger may rest his or her back. The aft-facing side 116 generally faces away from the passenger when used. In various examples, passenger vehicles, such as aircraft, include rows of passenger seat assemblies 100, and the aft-facing side 116 of one passenger seat faces the passenger in the behind passenger seat.

The passenger seat assembly 100 may also include a backrest cover 106 that covers the cushioning and frame members forming the backrest 104, a base cover 108 that covers the cushioning and frame members forming the base 102, armrests 118, headrests 120, and legs 110. In some cases, the passenger seat assembly 100 optionally includes a luggage bar 112, although it need not. In various cases, the passenger seat assembly 100 may also optionally include an IFE monitor 128 (see FIG. 2), although it need not (see FIGS. 7A-B).

In some examples, a tray table 122 is pivotally connected to the passenger seat assembly 100. In various examples, the number of tray tables 122 correlates with the number of backrests 104, although it need not. The tray table 122 is movable between a stowed position (see FIGS. 1 and 2) and a deployed position (see FIGS. 3-5). In the stowed position, the tray table 122 is adjacent to the backrest 104, and an upper surface 126 of tray table 122 faces the aft-facing side 116 of the backrest 104 while a lower surface 124 of the tray table 122 faces away from the aft-facing side 116. In the deployed position, the tray table 122 is spaced apart from the backrest 104, and the upper surface 126 generally faces upwards. In the deployed position, the passenger may optionally place various items of belonging on the upper surface 126 (see FIG. 5). The tray table 122 may be constructed from various plastics, aluminum, stainless steel, aramid fibers, polycarbonate, polypropylene, other metallic materials, composite materials, or other similar materials.

Figure 2:
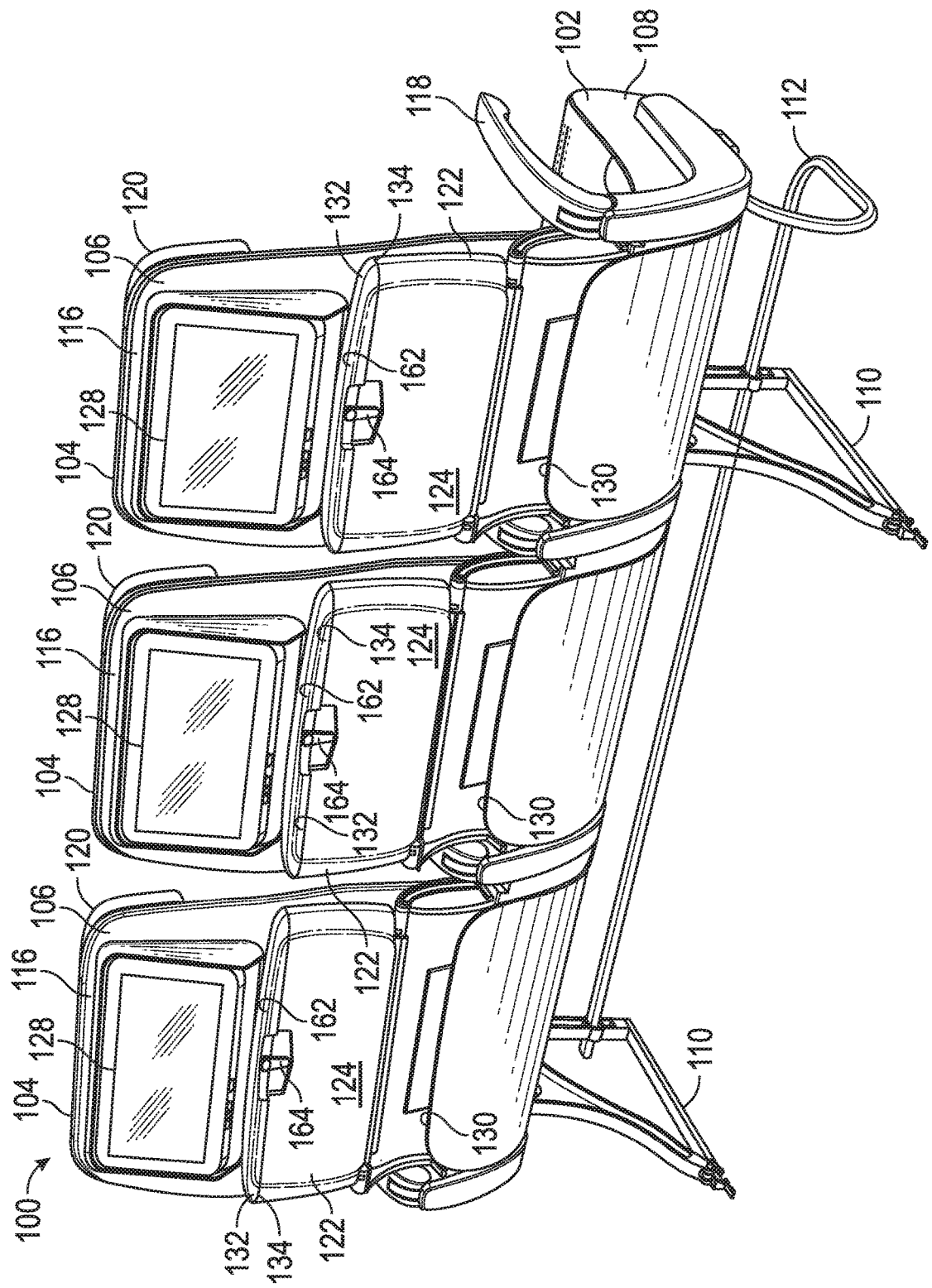
FIG. 2 is a rear perspective view of the passenger seat assembly of FIG. 1 with a configuration of amenities panels.
Figure 3:
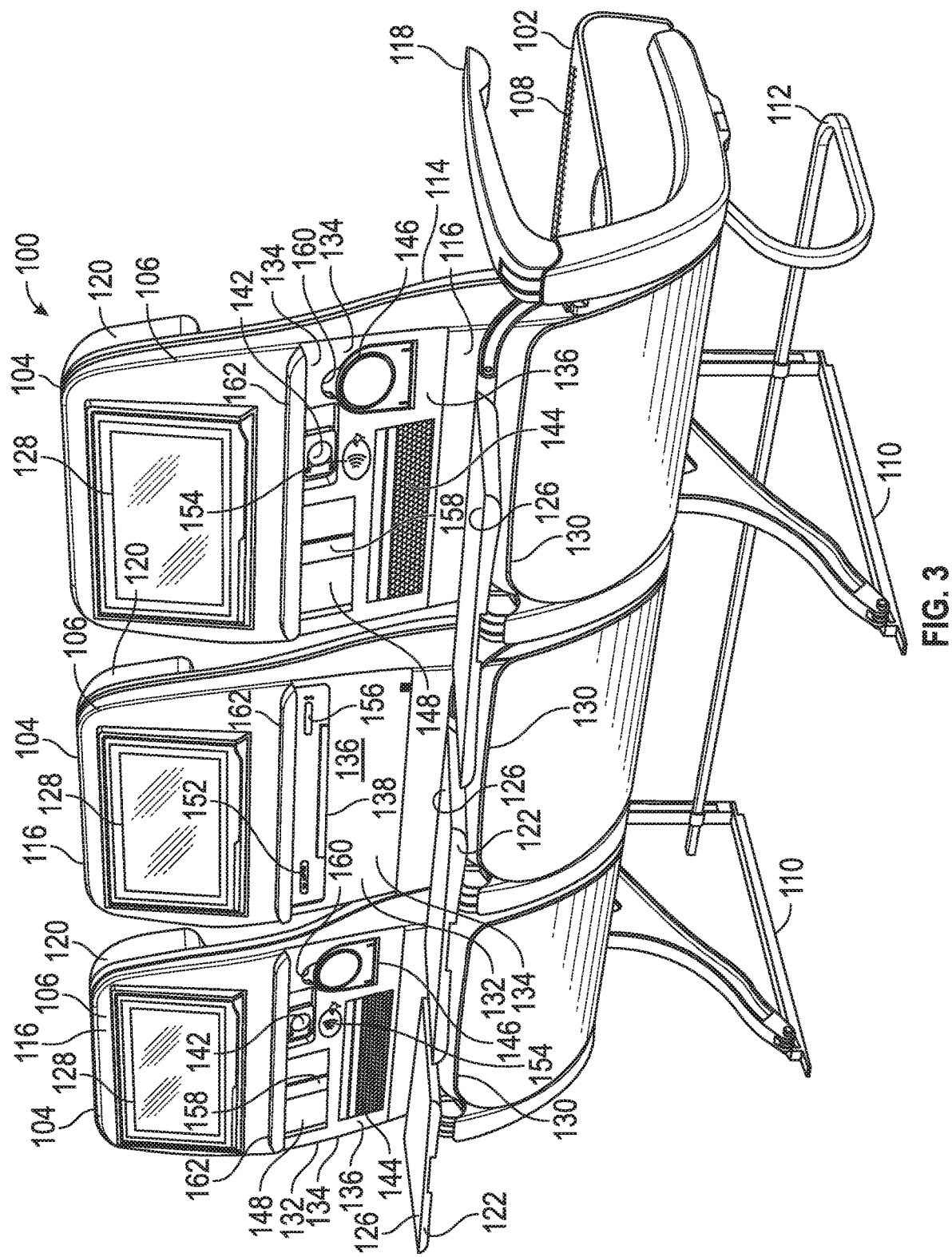
FIG. 3 is another rear perspective view of the passenger seat assembly of FIG. 1 with the configuration of amenities panels.

Optionally, as illustrated in FIG. 2, the passenger seat assembly 100 may include literature pockets 130 below the tray tables 122. As illustrated in FIG. 3, when the tray table 122 is in the deployed position, access to the literature pockets 130 is limited.

Figure 4:
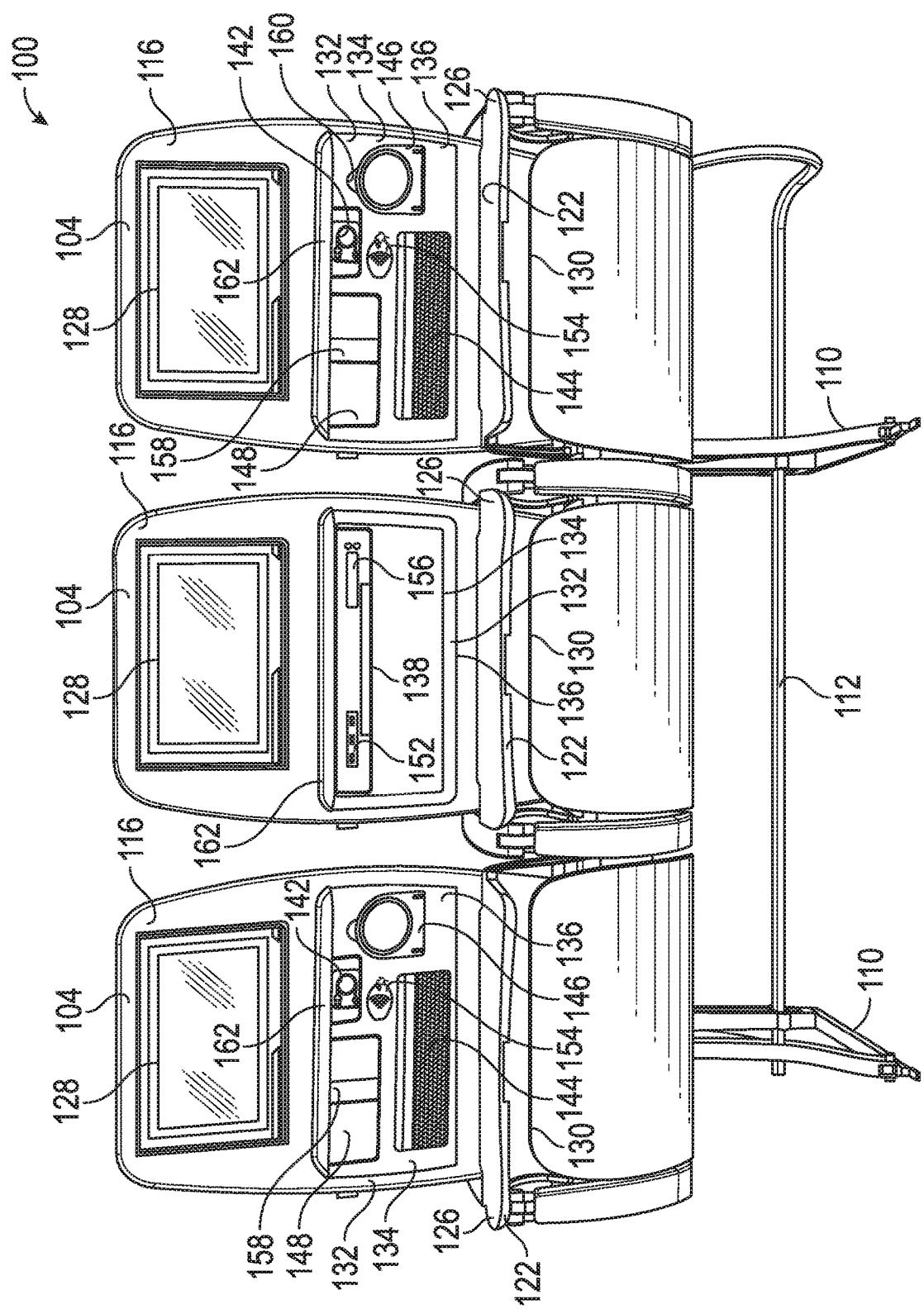
FIG. 4 is a rear view of the passenger seat assembly of FIG. 1 with the configuration of amenities panels.
Figure 5:
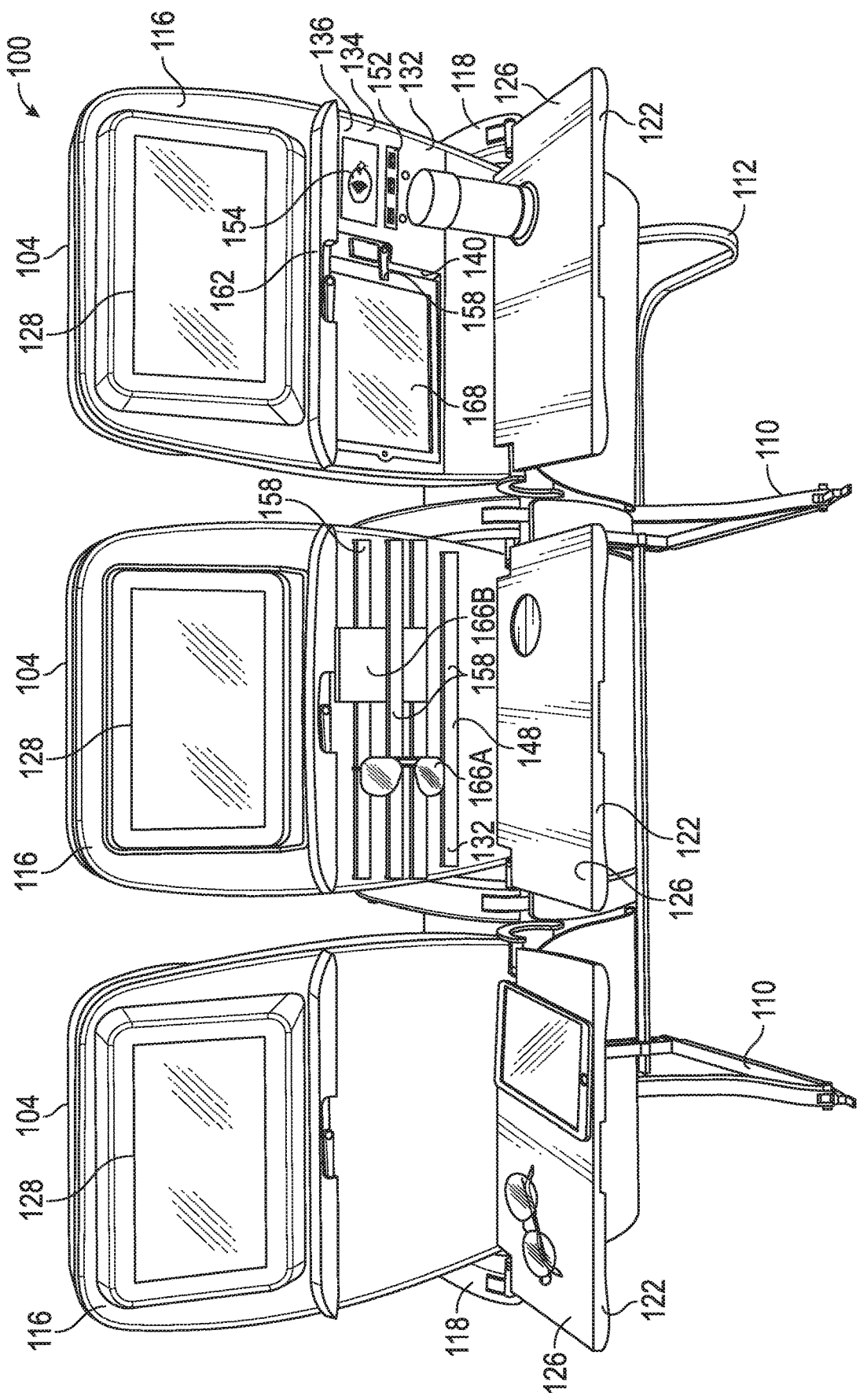
FIG. 5 is a rear view of the passenger seat assembly of FIG. 1 with another configuration of amenities panels.

Referring to FIGS. 3-5, in various examples, an amenities panel 132 is provided with the passenger seat assembly 100. The amenities panel 132 includes a body 134 and at least one convenience feature. In some examples, the amenities panel 132 includes a plurality of convenience features. The amenities panel 132 is connected to the passenger seat assembly 100. In some examples, each backrest 104 includes an amenities panel 132, although they need not (see FIG. 5).

The amenities panel 132 is provided at a location on the backrest 104 that is between the upper surface 126 of the tray table 122 and the forward-facing side 114 of the backrest 104 when the tray table 122 is stowed. Traditionally, this area behind the tray table 122 is empty and generally only includes the material forming the surface of the aft-facing side 116 of the backrest 104. By providing the amenities panel 132 in this area behind the tray table 122, the amenities panel 132 can support a number of functions without sacrificing any of the limited personal living space of the passenger.

The body 134 of the amenities panel 132 includes an aft-facing side 136 that faces outward from the backrest 104. When the tray table 122 is stowed, the aft-facing side 136 faces the upper surface 126 of the tray table 122. In various examples, the body 134 is dimensioned such that the amenities panel 132 is substantially covered by the tray table 122 when the tray table 122 is stowed. For example, in some cases, a majority of the aft-facing side 136 may be covered by the tray table 122 when the tray table 122 is stowed. In such examples, the amenities panel 132 may be hidden from view when the tray table 122 is stowed (see FIG. 7A). The body 134 may be constructed from various materials including, but not limited to, various plastics, aluminum, stainless steel, aramid fibers, polycarbonate, polypropylene, other metallic materials, composite materials, or other similar materials. In other examples, the body 134 may be constructed from various flexible or elastic materials. In some examples, the body 134 and the tray table 122 are constructed from the same material, although they need not be.

Optionally, in some examples, the amenities panel 132 includes a ledge 162 configured to abut an edge of the tray table 122 when the tray table 122 is in the stowed position (see FIG. 2). In some of these examples, the ledge 162 may include a latch 164 or other securing mechanism suitable for retaining the tray table 122 in the stowed position.

As described above, the amenities panel 132 includes at least one convenience feature. In some examples, the amenities panel 132 includes a plurality of convenience features. The convenience feature may be various components or features that are provided to enhance the travel experience for the passenger.

In some cases, the convenience feature may be various stowage or holder features including, but not limited to, a literature pocket 138, an electronics holder 140, cable stowage 142, a storage pocket 144, a cup holder 146, a universal holder 148, a shelf 150 (see FIGS. 6A-B), and various other stowage or holder mechanisms. Compared to the literature pocket 130, these stowage or holder features on the amenities panel 132 are more easily accessible, at a higher position such that they are visually in front of the passenger, and allows for quick retrieval of any stored items.

In some cases, these stowage features may be recessed into the amenities panel 132, although they need not be. In various examples, these stowage features optionally include retainers 158 to aid in retaining stowed items with the respective feature. The retainers 158 may be various retaining mechanisms including, but not limited to, latches, hooks, hook and loop fasteners, flexible bands, pins, bolts, snap-fit connectors, and various other suitable retaining mechanisms. In some examples, the type of retainer 158 may depend on the type of stowage feature. For example, referring to FIG. 5, the universal holder 148 may include a plurality of retainers 158 that are elastic bands to retain passenger items 166A-B, while the electronics holder 140 includes a retainer 158 that is a latch to retain a tablet device 168 in position.

The storage features may be constructed from various materials. For example, in some cases, the storage features may be constructed from a relatively rigid material that may be similar to the material used to construct the amenities panel 132, although it need not be. In such cases, the amount of space provided by the respective storage feature to accommodate the passenger's items may be relatively fixed. As one non-limiting example, the cup holder 146 may define a cup holder opening having a fixed dimension. In other examples, the storage feature may be constructed from a relatively flexible material such that the storage feature can accommodate various items with various shapes and sizes. As one non-limiting examples, the universal holder 148 may include a retainer 158 that is a flexible band. As another non-limiting example, the storage pocket 144 may be a net constructed from a network of bungee cords or other similar material.

In some examples, the various stowage features are pivotally connected to the amenities panel 132 such that the stowage features are movable between a deployed position and a stowed position. As one non-limiting example, the cup holder 146 is pivotally connected to the amenities panel 132 and is movable between a stowed position (see FIG. 3) and a deployed position (see FIG. 6A). As another non-limiting example and referring to FIGS. 6A-B and 7B, the shelf 150 is pivotally connected to the amenities panel 132 and is movable between a stowed position (see FIG. 7B) and a deployed position (see FIG. 6A).

Optionally, the amenities panel 132 may define a cavity corresponding to a particular type of stowage feature that is recessed into the amenities panel 132. For example, the amenities panel 132 may define a cup holder cavity 160 configured to receive the cup holder 146 when the cup holder 146 is in the stowed position. As another non-limiting example, the amenities panel 132 may define a shelf cavity 172 configured to receive the shelf 150 when the shelf 150 is in the stowed position. In some examples, the cavity is configured to receive the corresponding stowage feature such that the stowage feature is substantially flush with the aft-facing side 136 when stowed. As one non-limiting examples, the cup holder cavity 160 may be configured to receive the cup holder 146 such that the cup holder 146 is substantially flush with the aft-facing side 136 when in the stowed position.

The convenience feature may also be various connectivity features including, but not limited to, connectors such as USB ports 152, outlets or other ports, audio connectors, a wireless charging system 154, near-field communication (NFC) systems 156 (such as for payment systems or other NFC capable systems), and various other connectivity features. In certain examples, some of the connectivity features may be concealed by covers when not in use. In certain cases, the covers may include a graphic, decal, text, or various other indicators indicating the type of connectivity feature concealed by the particular cover.

In some examples, the convenience feature may also be various courtesy features such as a mirror or other similar features. It will be appreciated that the convenience feature may be various other types of features suitable for enhancing the travel experience of the passenger, and the above-described features are for exemplary purposes only.

As illustrated in FIGS. 3-5, each amenities panel 132 is customizable to include various combinations of convenience features. Thus, the type of convenience feature provided with the amenities panel 132 may be customized or adjusted depending on the needs of the end consumer. Furthermore, within a single passenger seat assembly, the convenience features on one amenities panel 132 do not necessarily need to be the same as the convenience features on another amenities panel 132. Optionally, in some cases, the amenities panel 132 may be omitted from one or more backrests 104 (see FIG. 5).

Referring to FIGS. 6A-B, a passenger seat assembly 200 is illustrated. The passenger seat assembly 200 is substantially similar to the passenger seat assembly 100 except that the passenger seat assembly 100 includes a single backrest 104. As illustrated in FIGS. 6A-B, the amenities panel 132 includes the cup holder 146, the universal holder 148, the shelf 150, and the wireless charging system 154 as convenience features.

The shelf 150 is configured to provide a surface on which the passenger may position some of his or her belongings. For example, in some cases, the shelf 150 may support a phone, tablet, various other electronic devices, literature, or various other items. In some examples, the shelf 150 includes a body 170 having a width and a length. In certain cases, support grooves 176 are defined along the length. The support grooves 176 provide various locations at which the passenger may engage his or her item with the shelf 150, such as to adjust an angle of a tablet device for viewing.

In some examples, the body 170 includes a shelf extension 174. As illustrated in FIGS. 6A-B, the shelf extension 174 is slidable relative to the body 170 and is movable between a stowed position (see FIG. 6A) and a deployed position (see FIG. 6B). In various examples, the shelf extension 174 in the deployed position increases the surface area of the shelf 150 on which the passenger may place his or her items.

Figure 7B:
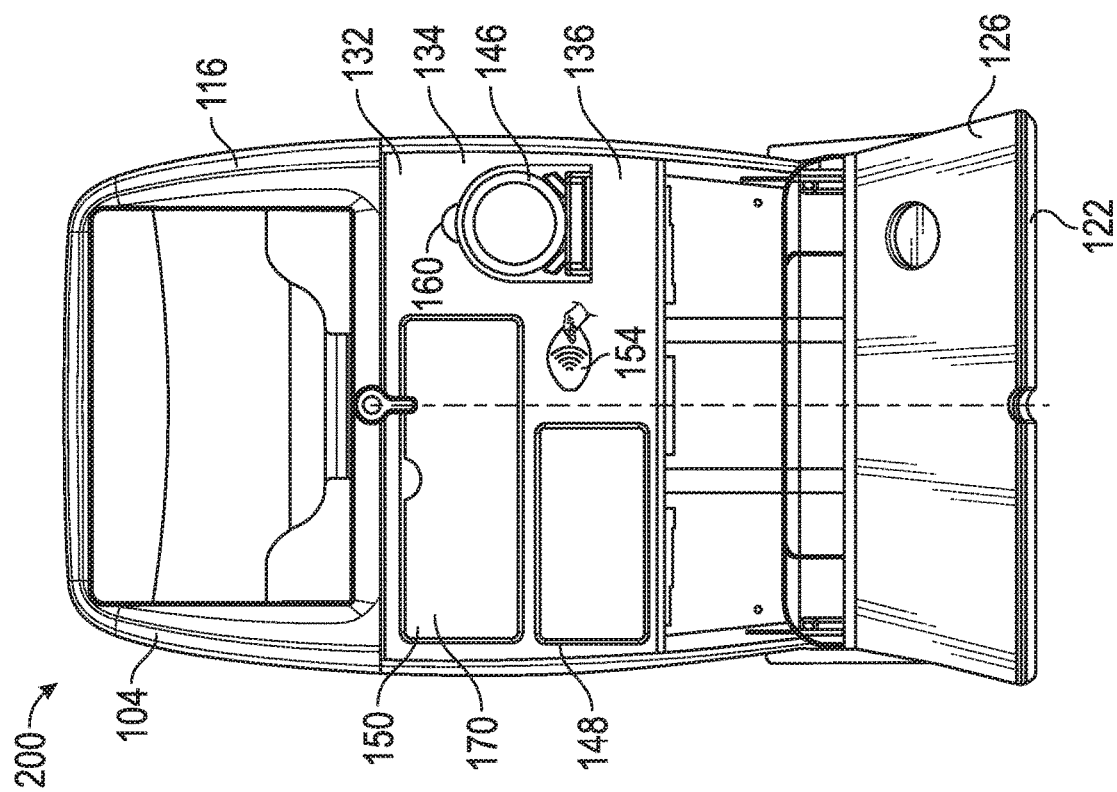
FIG. 7B is another rear perspective view of the passenger seat of FIG. 6A.
Figure 7A:
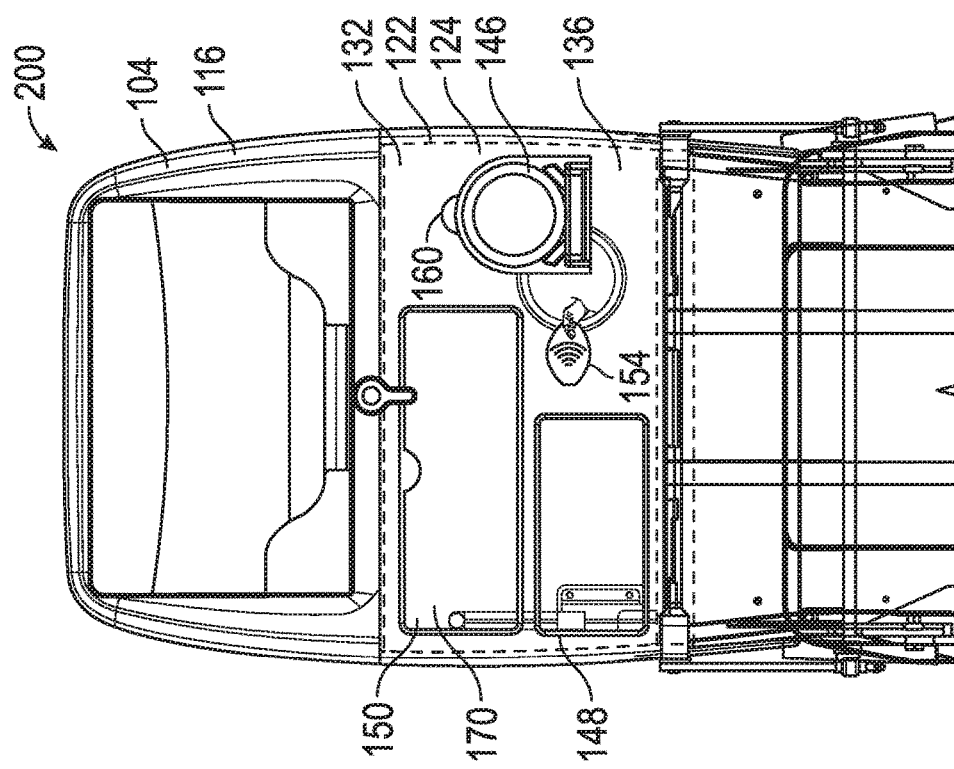
FIG. 7A is a rear perspective view of the passenger seat of FIG. 6A.

FIGS. 7A-B illustrate the positioning of the amenities panel 132 on the backrest 104. As illustrated in FIG. 7A, when the tray table 122 (shown in dashed lines) is in the stowed position, the tray table 122 substantially covers the amenities panel 132 such that the amenities panel 132 is hidden from view (i.e., a majority of the amenities panel 132 is within the dashed line boundary indicating the edges of the tray table 122). In other words, the amenities panel 132 is covered by the tray table 122 when the tray table 122 is in the stowed position. To access the amenities panel 132, the tray table 122 is moved to the deployed position (see FIG. 7B). In various examples, the tray table 122 may be stowed with items inside the amenities panel 132 if those items do not interfere with the normal stowing and/or deploying of the tray table 122 (e.g., if an item is within a recessed pocket or has dimensions that do not interfere with the stowing of the tray table 122). In other examples, items that interfere with the stowing of the tray table 122 are removed from the amenities panel 132 before the tray table 122 is stowed.

Figure 8A:
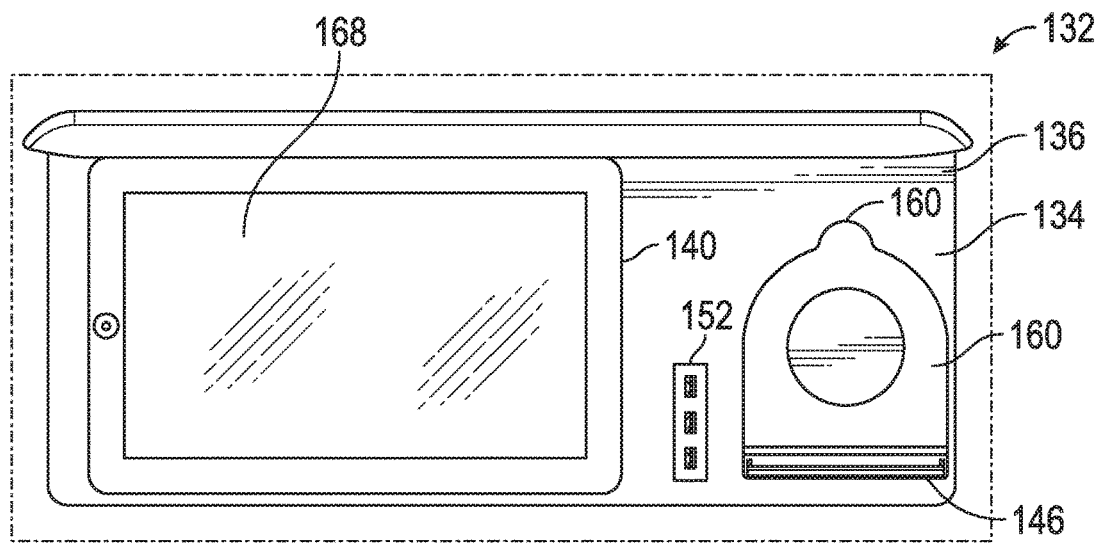
FIG. 8A illustrates an example of an amenities panel according to aspects of the current disclosure.
Figure 8B:
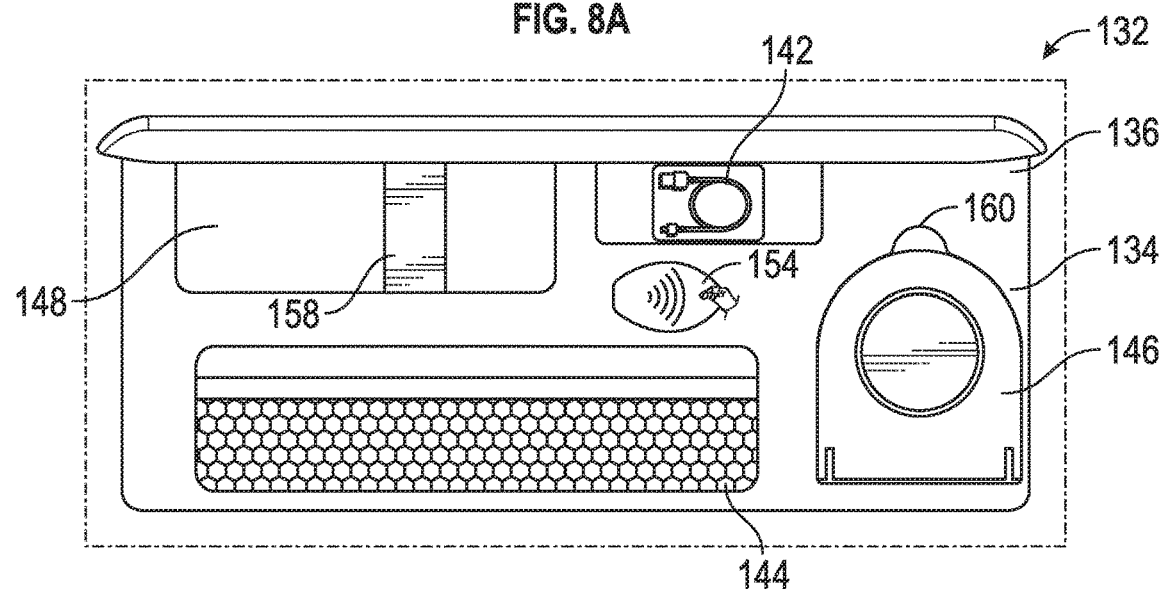
FIG. 8B illustrates an example of an amenities panel according to aspects of the current disclosure.
Figure 8C:
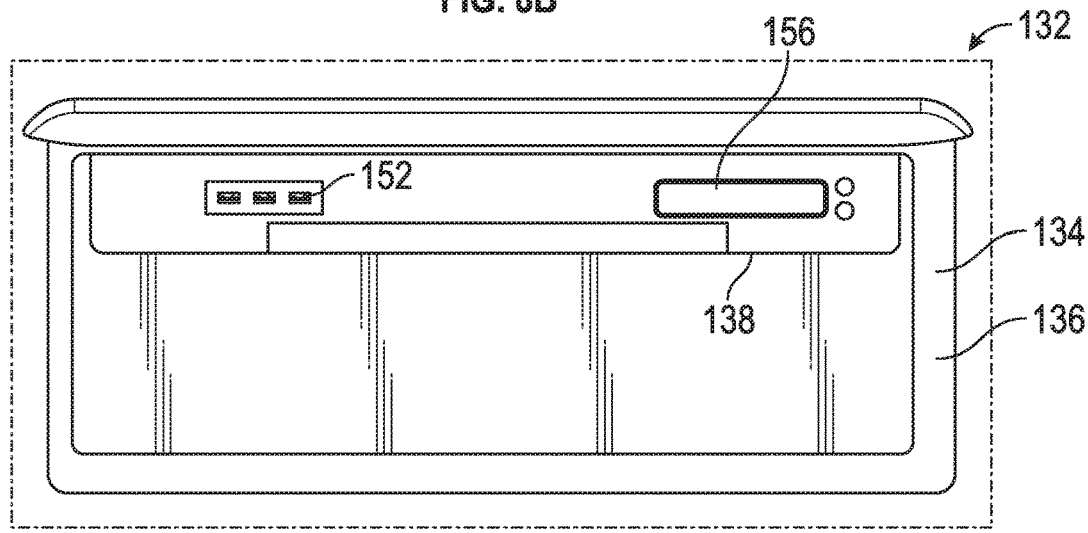
FIG. 8C illustrates an example of an amenities panel according to aspects of the current disclosure.

FIGS. 8A-C illustrate various exemplary combinations of convenience features on the amenities panel 132. It will be appreciated that the amenities panels are illustrated for exemplary purposes only and various other combinations of convenience features may be provided on the amenities panel 132.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive, and the invention is not limited to these example embodiments but rather encompasses all possible modifications and variations within the scope of the issued claims and their equivalents.

EC 1. A passenger seat comprising: a backrest comprising a forward-facing side and an aft-facing side; a tray table comprising an upper surface and a lower surface, the tray table pivotally connected to the backrest and movable between a stowed position and a deployed position; and an amenities panel connected to the backrest and positioned between the forward-facing side of the backrest and the upper surface of the tray table when the tray table is in the stowed position, the amenities panel comprising at least one convenience feature.

EC 2. The passenger seat of any of the preceding or subsequent example combinations, wherein the amenities panel comprises an aft-facing side, and wherein the aft-facing side of the amenities panel faces the upper surface of the tray table when the tray table is in the stowed position.

EC 3. The passenger seat of any of the preceding or subsequent example combinations, wherein the at least one convenience feature comprises a shelf comprising a body defining a support surface, and wherein the shelf is pivotable relative to the aft-facing side of the amenities panel between a stowed position and a deployed position when the tray table is in the deployed position.

EC 4. The passenger seat of any of the preceding or subsequent example combinations, wherein the support surface comprises support grooves extending across a width of the shelf.

EC 5. The passenger seat of any of the preceding or subsequent example combinations, wherein the shelf further comprises a shelf extension, wherein a width of the shelf extension is less than a width of the body of the shelf, and wherein the shelf extension is slidable relative to the body of the shelf between a deployed position and a stowed position when the tray table is in the deployed position.

EC 6. The passenger seat of any of the preceding or subsequent example combinations, wherein the aft-facing side of the amenities panel defines a shelf-receiving cavity, wherein the shelf is positionable within the shelf-receiving cavity when the shelf is in the stowed position, and wherein a lower surface of the shelf is substantially flush with the aft-facing side of the amenities panel when the shelf is in the stowed position.

EC 7. The passenger seat of any of the preceding or subsequent example combinations, wherein the at least one convenience feature comprises a cup holder, wherein the cup holder is pivotally connected to the amenities panel and movable between a stowed position and a deployed position, and wherein the amenities panel further defines a cup holder cavity configured to receive the cup holder when the cup holder is in the deployed position.

EC 8. The passenger seat of any of the preceding or subsequent example combinations, wherein the at least one convenience feature comprises an electronics connector, and wherein the amenities panel further comprises an electronics connector cover configured to selectively cover the electronics connector when not in use.

EC 9. The passenger seat of any of the preceding or subsequent example combinations, wherein the passenger seat further comprises an In-Flight Entertainment monitor connected to the electronics connector.

EC 10. The passenger seat of any of the preceding or subsequent example combinations, wherein the at least one convenience feature comprises at least one of a bungee pocket, a literature pocket, a bungee band, a mirror, a wireless payment system, cable storage, or a wireless charging system.

EC 11. The passenger seat of any of the preceding or subsequent example combinations, wherein the amenities panel comprises a plurality of convenience features.

EC 12. An amenities panel for a passenger seat comprising: a body comprising an aft-facing side, the body configured to connect to a backrest of the passenger seat and be positioned between a forward-facing side of the backrest and a stowed tray table; and at least one convenience feature on the aft-facing side.

EC 13. The amenities panel of any of the preceding or subsequent example combinations, wherein the at least one convenience feature comprises a shelf comprising a body defining a support surface, and wherein the shelf is pivotable relative to the aft-facing side of the amenities panel between a stowed position and a deployed position.

EC 14. The amenities panel of any of the preceding or subsequent example combinations, wherein the shelf further comprises a shelf extension, wherein a width of the shelf extension is less than a width of the body of the shelf, and wherein the shelf extension is slidable relative to the body of the shelf between a deployed position and a stowed position.

EC 15. The amenities panel of any of the preceding or subsequent example combinations, wherein the aft-facing side defines a shelf-receiving cavity, wherein the shelf is positionable within the shelf-receiving cavity when the shelf is in the stowed position, and wherein a lower surface of the shelf is substantially flush with the aft-facing side of the amenities panel when the shelf is in the stowed position.

EC 16. The amenities panel of any of the preceding or subsequent example combinations, wherein the at least one convenience feature comprises at least one of a cup holder, an electronics connector, a bungee pocket, a literature pocket, a bungee band, a mirror, a wireless payment system, cable storage, or a wireless charging system.

EC 17. A passenger seat comprising: a backrest; a tray table connected to the backrest and movable between a stowed position and a deployed position; and an amenities panel comprising at least one convenience feature, the amenities panel connected to the backrest and positioned between the backrest and the tray table when the tray table is in the stowed position.

EC 18. The passenger seat of any of the preceding or subsequent example combinations, wherein the tray table substantially covers the amenities panel when the tray table is in the stowed position.

EC 19. The passenger seat of any of the preceding or subsequent example combinations, wherein the at least one convenience feature comprises at least one of a shelf, a cup holder, an electronics connector, a bungee pocket, a literature pocket, a bungee band, a mirror, a wireless payment system, cable storage, or a wireless charging system.

EC 20. The passenger seat of any of the preceding or subsequent example combinations, wherein the amenities panel comprises a plurality of convenience features.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A passenger seat comprising:
   a backrest comprising a forward-facing side and an aft-facing side;
   a tray table comprising an upper surface and a lower surface, the tray table pivotally connected to the backrest and movable between a stowed position and a deployed position; and
   an amenities panel connected to the backrest and comprising at least one convenience feature, wherein the amenities panel is positioned between the forward-facing side of the backrest and the upper surface of the tray table when the tray table is in the stowed position such that the at least one convenience feature is covered by the tray table when the tray table is in the stowed position,
   wherein the amenities panel comprises the aft-facing side, and wherein the aft-facing side of the amenities panel faces the upper surface of the tray table when the tray table is in the stowed position, and
   wherein the at least one convenience feature comprises a shelf comprising a body defining a support surface, and wherein the shelf is pivotable relative to the aft-facing side of the amenities panel between a stowed position and a deployed position when the tray table is in the deployed position, and wherein the shelf extends horizontally in the deployed position.

2. The passenger seat of claim 1, wherein the support surface comprises support grooves extending across a width of the shelf.

3. The passenger seat of claim 1, wherein the shelf further comprises a shelf extension, wherein a width of the shelf extension is less than a width of the body of the shelf, and wherein the shelf extension is slidable relative to the body of the shelf between a deployed position and a stowed position when the tray table is in the deployed position.

4. The passenger seat of claim 1, wherein the aft-facing side of the amenities panel defines a shelf-receiving cavity, wherein the shelf is positionable within the shelf-receiving cavity when the shelf is in the stowed position, and wherein a lower surface of the shelf is substantially flush with the aft-facing side of the amenities panel when the shelf is in the stowed position.

5. The passenger seat of claim 1, wherein the at least one convenience feature comprises a cup holder, wherein the cup holder is pivotally connected to the amenities panel and movable between a stowed position and a deployed position, and wherein the amenities panel further defines a cup holder cavity configured to receive the cup holder when the cup holder is in the stowed position.

6. The passenger seat of claim 1, wherein the at least one convenience feature comprises an electronics connector, and wherein the amenities panel further comprises an electronics connector cover configured to selectively cover the electronics connector when not in use.

7. The passenger seat of claim 6, wherein the passenger seat further comprises an In-Flight Entertainment monitor connected to the electronics connector.

8. The passenger seat of claim 1, wherein the at least one convenience feature comprises at least one of a bungee pocket, a literature pocket, a bungee band, a mirror, a wireless payment system, cable storage, or a wireless charging system.

9. The passenger seat of claim 8, wherein the amenities panel comprises a plurality of convenience features.

10. An amenities panel for a passenger seat comprising:
a body comprising an aft-facing side, the body configured to connect to a backrest of the passenger seat and be positioned between the backrest and a stowed tray table; and
at least one convenience feature on the aft-facing side, wherein the at least one convenience feature comprises a shelf comprising a body defining a support surface, wherein the shelf is pivotable relative to the aft-facing side of the amenities panel between a stowed position and a deployed position, wherein the shelf extends horizontally in the deployed position.

11. The amenities panel of claim 10, wherein the shelf further comprises a shelf extension, wherein a width of the shelf extension is less than a width of the body of the shelf, and wherein the shelf extension is slidable relative to the body of the shelf between a deployed position and a stowed position.

12. The amenities panel of claim 10, wherein the aft-facing side defines a shelf-receiving cavity, wherein the shelf is positionable within the shelf-receiving cavity when the shelf is in the stowed position, and wherein a lower surface of the shelf is substantially flush with the aft-facing side of the amenities panel when the shelf is in the stowed position.

13. The amenities panel of claim 10, wherein the at least one convenience feature comprises at least one of a cup holder, an electronics connector, a bungee pocket, a literature pocket, a bungee band, a mirror, a wireless payment system, cable storage, or a wireless charging system.

14. A passenger seat comprising:
a backrest;
a tray table connected to the backrest and movable between a stowed position and a deployed position; and
an amenities panel comprising at least one convenience feature, the amenities panel connected to the backrest and positioned between the backrest and the tray table when the tray table is in the stowed position, wherein the at least one convenience feature comprises a shelf comprising a body defining a support surface, and wherein the shelf is pivotable relative to the amenities panel between a stowed position and a deployed position when the tray table is in the deployed position, wherein the shelf extends horizontally in the deployed position.

15. The passenger seat of claim 14, wherein the tray table substantially covers the amenities panel when the tray table is in the stowed position.

16. The passenger seat of claim 14, wherein the at least one convenience feature comprises at least one of, a cup holder, an electronics connector, a bungee pocket, a literature pocket, a bungee band, a mirror, a wireless payment system, cable storage, or a wireless charging system.

17. The passenger seat of claim 16, wherein the amenities panel comprises a plurality of convenience features.

* * * * *